Jan. 29, 1929.

J. J. FERLIN ET AL 1,700,567

PISTON PACKING FOR PUMPS

Filed May 17, 1926

Inventors
John J. Ferlin
Thomas A. Creighton

By Lyon & Lyon

Attorneys

Patented Jan. 29, 1929.

1,700,567

UNITED STATES PATENT OFFICE.

JOHN J. FERLIN, OF LOS ANGELES, AND THOMAS A. CREIGHTON, OF VENTURA, CALIFORNIA.

PISTON PACKING FOR PUMPS.

Application filed May 17, 1926. Serial No. 109,545.

This invention relates to packing for pistons of pump cylinders, and while the invention is applicable for packing pump pistons used for any purpose whatever, it is particularly useful when applied to pumps subjected to hard usage, such as pumps used in oil well practice which frequently pump water or mud carrying a considerable amount of sand. The packing in such pumps is destroyed so rapidly by the sand that the piston must frequently be adjusted to keep the packing tight. The construction employed usually involves a pair of members between which the packing is located, and means is provided for drawing these members together to compress the packing. It has been attempted to provide means for accomplishing this from the outside of the cylinder in order to avoid the necessity for taking off the cylinder head to gain access to the piston to adjust it, but heretofore such devices have usually employed threaded connections located within the cylinder; and it has been found that on account of the high pressures developed in the cylinders, the sand in the water will cut out such threads and cause leakage and bring about a condition requiring the repair of replacement of parts.

The general object of this invention is to provide a simple construction by means of which the packing can be adjusted from the exterior of the cylinder and in which the use of threads exposed to the sandy water within the cylinder is avoided; also to provide an improved means for effectively packing the piston rod to prevent the access of the sandy water to the connection located outside of the cylinder, which enables the packing to be adjusted.

In the preferred embodiment of the invention, a sleeve is employed surrounding the piston rod, and the end of this sleeve thrusts against one of the piston members to force it toward the opposite piston member, and one of the objects of this invention is to provide an improved construction for packing the connection between the sleeve and its corresponding piston member.

Further objects of the invention will appear hereinafter.

The invention consists in the novel parts and combination of parts to be described hereinafter, all of which contribute to produce an efficient piston packing for pumps.

A preferred embodiment of the invention is described in the following specification, while the broad scope of the invention is pointed out in the appended claims.

In practicing the invention, we provide a piston head having a packing, with two members on opposite sides of the packing, mounted so that they are movable toward each other to compress the packing. The piston rod is connected with one of the members and a sleeve is provided over the rod engaging with the other member so as to exert a thrust upon it; outside of the cylinder we provide a connection between the rod and the sleeve for producing relative longitudinal movement of the rod and sleeve which operates to draw the said members together and compress the packing.

The members which compress the packing are provided on their inner faces with tapered annular ribs which are received in corresponding annular grooves in the packing, so that when the packing is compressed, a portion of it is forced outwardly against the liner or wall of the cylinder and the inner portion is forced inwardly against the face of the piston rod. In this way the rod and the cylinder wall are effectively packed. In addition to this, we provide special packing means at the connection between the sleeve and its corresponding piston member, which also prevents passage of water under pressure between the piston rod and the sleeve.

Figure 1:
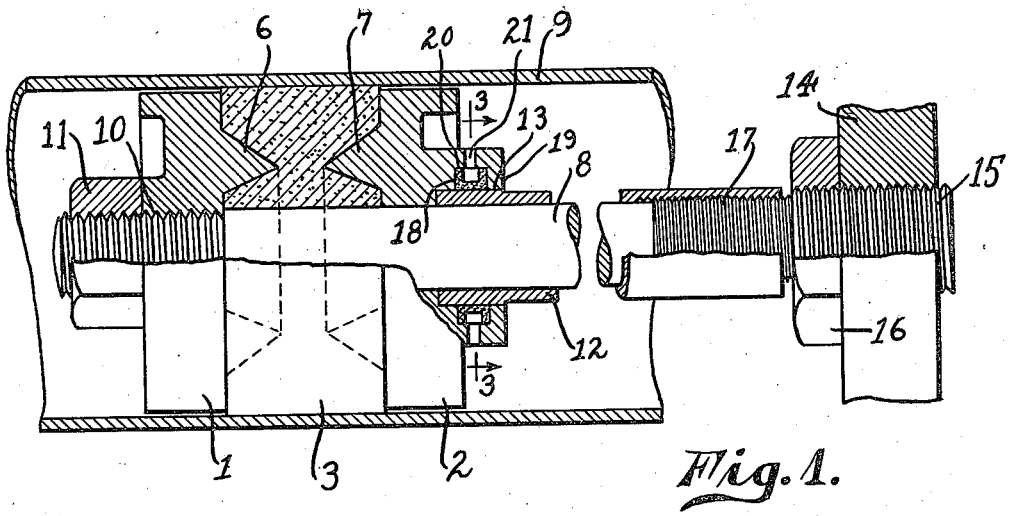
Figure 1 is a longitudinal section and partial elevation broken away, and illustrating an embodiment of our invention; this view shows a short portion of the cylinder wall or liner.
Figure 2:
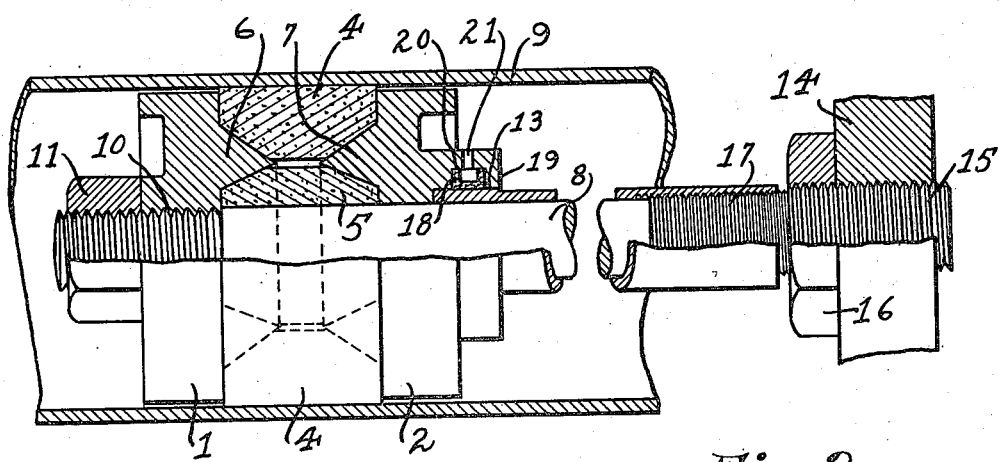
Fig. 2 is a view similar to Fig. 1, but showing another embodiment for the piston packing.
Figure 3:
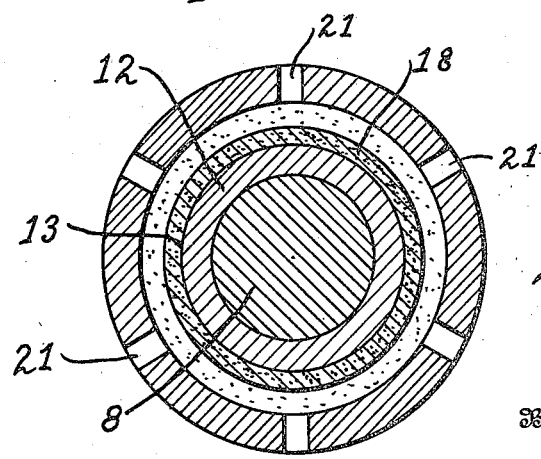
Figure 3 is a vertical section taken on the line 3—3 of Fig. 1, upon an enlarged scale.

In the preferred embodiment of the invention, the piston comprises two members or discs 1 and 2 disposed on opposite sides of the packing 3, and this packing may be in the form of a single ring, as shown in Fig. 1, or in the form of an outer ring 4 and an inner ring 5 (see Fig. 2). In either case, the packing is formed so that it presents a tapered groove, such as a V-shaped groove 6, that is to say, there is a groove 6 on the outer side of the packing and each piston disc has a corresponding tapered or V-shaped rib 7 of annular form to fit into the packing groove.

The piston members 1 and 2 are mounted on a piston rod 8 so that they may be drawn together to compress the packing; when the packing is compressed, the outer part of it is compressed against the inner face of the cylinder wall or liner 9, and the inner portion is compressed against the face of the piston rod 8. The inner member or piston disc 1 may be rigidly secured to the piston rod by any suitable means such as the thread connection 10 and a check nut 11.

We provide means operatable from the exterior of the cylinder for forcing the discs 1 and 2 toward each other. For this purpose, we provide a tubular stem or sleeve 12 surrounding the piston rod 8, and this sleeve engages or is connected to its corresponding piston disc 2. In the present instance, we do not secure the sleeve to the disc but merely provide a connection through which thrust in the sleeve may be exerted against the disc. As illustrated, we provide a stuffing box or socket 13 in which the inner end of the sleeve 12 is received. The sleeve 12 extends to the outside of the cylinder and preferably to a point near the cross head 14, to which the end of the piston rod is attached by an up-set thread connection 15 and check nut 16. We provide a connection between the sleeve and the piston rod; this may be located anywhere on the rod but preferably under the crosshead. It enables relative longitudinal movement to be produced between the rod and the sleeve, operating to force the sleeve inwardly on the rod. This connection may be simply a thread connection 17, such as illustrated. With this construction, it will be evident that if a pipe wrench is applied to the sleeve 12 at any point outside of the cylinder, it can be rotated on the thread connection 17 so as to advance it toward the left, thereby exerting thrust on the disc 2 to force the same toward the disc 1 so as to compress the packing.

In order to pack the connection between the sleeve 12 and the piston member 2, we provide an undercut annular recess or packing chamber 18 in the boss or hub 19 which we form on the outer side of this piston member. In this packing chamber 18, we provide a packing ring 20 which is constructed in such a way that the water under pressure in the cylinder can be admitted to it so as to press it against the faces which it is to pack. In the present instance we form this ring so that it is in the form of a channel in cross section, with the open side of the channel disposed outwardly. The hub or boss 19 is provided with means, such as openings or ports 21, through its outer side, which admit the water into the channel of the packing ring. With this construction, it will be evident that the liquid pressure in the channel will exert its pressure to force the packing ring tightly against the outer face of the sleeve, and it will also exert its force against the flanges or ends of the packing ring to press them against the flat faces of the chamber 20. In this way a very effective packing-off of the piston will be accomplished which will prevent water from the interior of the cylinder working its way through the socket or stuffing box 13. In other words, this packing prevents the water from forcing its way through the socket 13 and between the rod 8 and the sleeve. In this way, we effectively prevent access of the sandy water to the thread connection 17 at which the packing 3 can be adjusted.

It is understood that the embodiment of the invention described herein is only one of the many embodiments this invention may take, and we do not wish to be limited in the practice of the invention, nor in the claims, to the particular embodiment set forth.

The advantage of constructing the packing in two parts, as illustrated in Fig. 2, is that the outer part of the packing can be replaced when it becomes worn without necessitating the replacing of the inner portion. Of course, the wear upon the outer portion is great and there is very little wear upon the inner portion.

The packing around the piston rod of course operates to prevent any leakage from the left end of the cylinder into the sleeve and around the piston rod 8.

What we claim is:

1. In packing for a pump cylinder, the combination of a piston head having a packing ring with two members on opposite sides of the same, and movable toward each other to compress the packing, a piston rod rigidly connected with one of said members, a sleeve mounted on the rod capable of rotation on the same, and having a loose connection with the other of said members for exerting thrust against the same, a connection between the rod and the sleeve outside of the cylinder for producing a relative longitudinal movement of the same to force the said members together and compress the packing, and means for packing the connection between the sleeve and its corresponding member.

2. In packing for a pump cylinder, the combination of a piston head having a packing ring with two discs on opposite sides of the same, movable toward each other to compress the packing, a piston rod connected with one of said discs, the other of said discs having a socket in its outer side, a sleeve on the rod with its end received in said socket for exerting thrust against the last named disc, means for packing the end of the sleeve within the socket to prevent liquid within the pump forcing its way between the rod and the sleeve, and a connection between the rod and the sleeve outside of the cylinder for producing a relative longitudinal movement of the rod and the sleeve to force the said discs together and compress the packing.

3. In packing for a pump cylinder, the combination of a piston head having a packing ring with two discs on opposite sides of the same, movable toward each other to compress the packing, a piston rod connected with one of said discs, the other of said discs having a socket in its outer side, a sleeve on the rod with its end received in said socket for exerting thrust against the last named disc, a packing ring disposed around the sleeve at the said socket, with means for admitting liquid under pressure from the interior of the cylinder into contact with the last named packing ring to prevent liquid within the pump forcing its way between the rod and the sleeve, and a connection between the rod and the sleeve for producing a relative longitudinal movement of the rod and the sleeve to force the said discs together and compress the packing.

4. In packing for a pump cylinder, the combination of a piston head having a packing ring with two discs on opposite sides of the same, movable toward each other to compress the packing, a piston rod connected with one of said discs, the other of said discs having a socket in its outer side, a sleeve on the rod with its end received in said socket for exerting thrust against the last named disc, a packing ring around the end of the sleeve within the socket of substantially channel form in cross secton, with the opening of the channel disposed outwardly, means for admitting liquid under pressure from the interior of the cylinder into the channel of the packing ring to pack the socket and prevent liquid within the pump forcing its way between the rod and the sleeve, and a connection between the rod and the sleeve for producing a relative longitudinal movement of the rod and the sleeve to force the said discs together and compress the packing.

5. In packing for a pump cylinder, the combination of a piston rod, a pair of discs, packing disposed between the discs, said packing having an annular tapered groove on each side thereof, said discs each having an annular tapered rib corresponding to each groove and projecting into the same, and means for drawing the discs together to force the packing against the liner of the cylinder and against the piston rod.

6. In packing for a pump cylinder, the combination of a piston rod, a pair of discs, packing disposed between the discs, said packing having an annular tapered groove on each side thereof, said discs each having an annular tapered rib corresponding to each groove and projecting into the same, a sleeve surrounding the rod and thrusting at its end against one of the discs, and a connection between the rod and the sleeve for producing a relative longitudinal movement of the rod and sleeve, operating to draw the discs together and compress the packing against the wall of the cylinder and against the piston rod.

7. In packing for a pump cylinder, the combination of a piston rod, a pair of discs, packing disposed between the discs, said packing having an annular tapered groove on each side thereof, said discs each having an annular tapered rib corresponding to each groove and projecting into the same, a sleeve surrounding the rod and thrusting at its end against one of the discs, and a connecting between the rod and the sleeve outside of the cylinder for producing a relative longitudinal movement of the rod and sleeve, operating to draw the discs together and compress the packing against the wall of the cylinder and against the piston rod, and means for packing the end of the sleeve where it thrusts against its corresponding disc to prevent liquid within the cylinder from forcing its way between the rod and the sleeve.

Signed at Ventura, California, this 7 day of May, 1926.

JOHN J. FERLIN.
THOMAS A. CREIGHTON.